United States Patent [19]

Angel

[11] Patent Number: 4,549,576

[45] Date of Patent: Oct. 29, 1985

[54] QUICK DISCONNECT MARINE COUPLING SYSTEM

[75] Inventor: Bruce A. Angel, Stokesdale, N.C.

[73] Assignee: AMF Incorporated, White Plains, N.Y.

[21] Appl. No.: 301,253

[22] Filed: Sep. 11, 1981

[51] Int. Cl.⁴ .............................................. F16L 37/28
[52] U.S. Cl. ............................ 137/614.04; 137/899.2; 285/158
[58] Field of Search ............... 285/175, 189, 316, 158, 285/161; 137/614.02, 614.03, 614.04, 899.2; 251/144, 149.6

[56] References Cited

U.S. PATENT DOCUMENTS

| | | | |
|---|---|---|---|
| 289,075 | 11/1883 | Davey | 285/171 |
| 861,828 | 7/1907 | Grindrod et al. | 285/175 |
| 1,755,104 | 4/1930 | Deierlein | 285/158 |
| 2,490,687 | 12/1949 | Guarnaschelli | 285/175 |
| 2,666,656 | 1/1954 | Bruning | 137/899.2 |
| 2,889,158 | 6/1959 | Hughes-Caley | 137/614.04 |
| 3,336,053 | 8/1967 | Carse | 251/149.6 |
| 3,575,221 | 4/1971 | Mochizuki et al. | 251/149.6 |
| 3,842,614 | 10/1974 | Karcher et al. | 137/614.04 |

Primary Examiner—A. Michael Chambers
Attorney, Agent, or Firm—David E. Dougherty; Walter R. Pfluger

[57] ABSTRACT

The system comprises stationary and removable couplers. The stationary one is mounted in a pipe flange by a thread ending in a stop flange. The stationary coupler is adapted to alternately receive each of a pair of removable couplers, one being adapted to receive the female end fitting of a hose, and the other the male end fitting of a hose.

7 Claims, 1 Drawing Figure

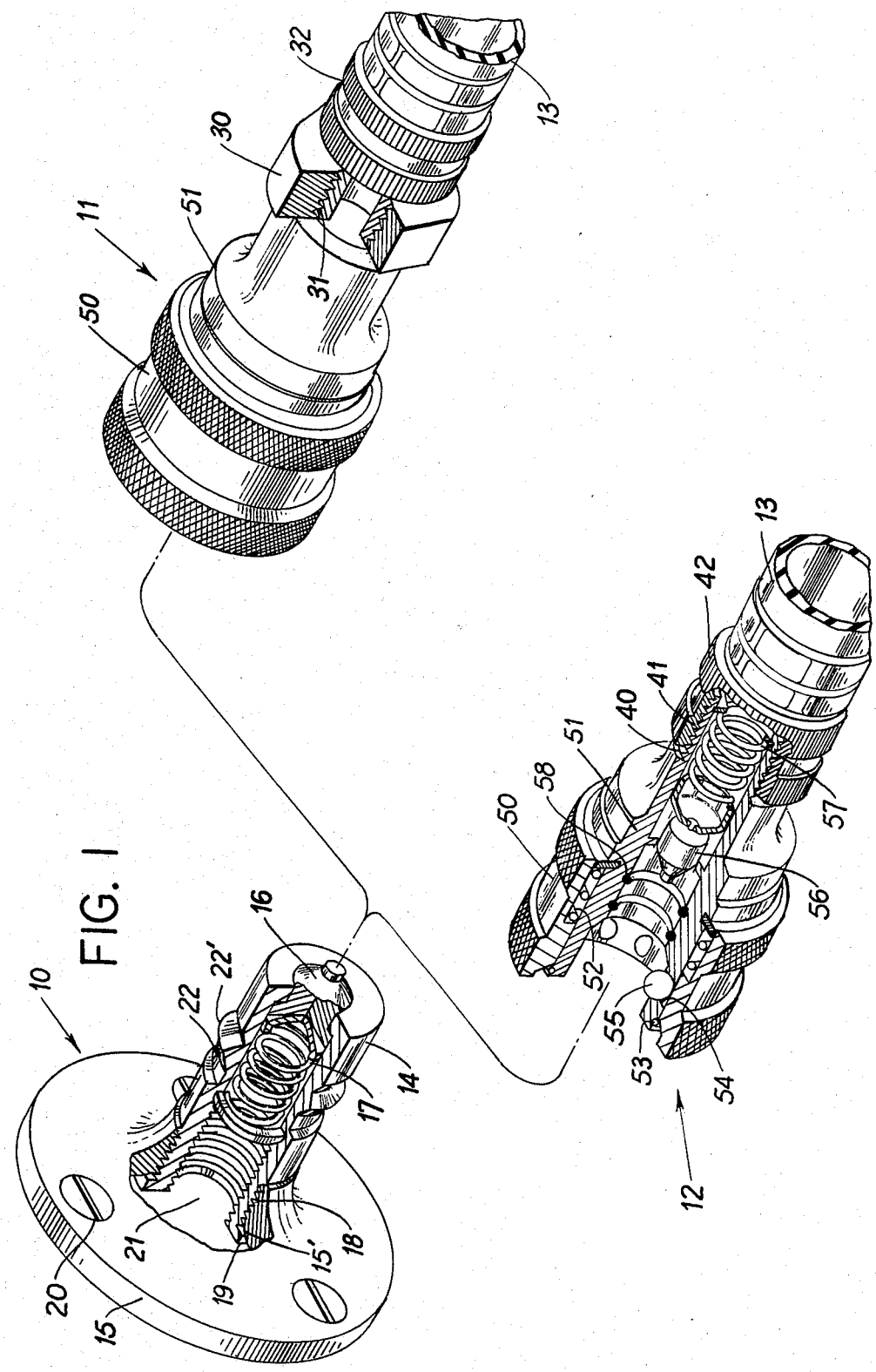

QUICK DISCONNECT MARINE COUPLING SYSTEM

This invention relates to an improved quick disconnect marine coupling system.

It is an object of this invention to provide a versatile assembly of marine couplers which can be used for dockside water supply or salt and fresh water washdown.

It is a further object of the invention to provide an assembly of marine couplers which is attractive in appearance, low cost, easy to operate, and readily constructed from readily available commercial components.

Briefly, the invention comprises an assembly of three couplers, one being stationary, and the other two removable, the last two being adapted to receive either the male or female ends of fresh or salt water hose end fittings.

The invention will be best understood by considering the attached single sheet of drawing with the ensuing description of one embodiment of the invention, the single sheet of drawing comprising a single FIG. 1, which is an exploded broken away perspective view of the improved disconnect assembly.

Turning now particularly to the drawing, shown therein is a coupler assembly or system comprising three couplers 10, 11, and 12. Coupler 10 is stationary, whereas couplers 11 and 12 are removable. Couplers 11 and 12 are identical except for a difference at their outer ends so that they can receive the male and female ends respectively of a water hose 13.

Coupler 10 comprises a tubular housing 14. The inner end of housing 14 is mounted in a pipe flange 15. The outer end of the housing 14 is closed by a valve 16 which is biased to closed position by an internal spring 17.

The inner end of housing 14 is mounted in the pipe flange 15 by a threaded connection 18 therebetween. Turning housing 14 clockwise or to the right loosens the same, and turning it counterclockwise or to the left tightens the same. The threads 18 on the housing 14 are backed up or end in a stop rim or flange 19. Thus, continued turning of the housing 14 to the left or counterclockwise will cause the stop rim 19 to engage the rim opening 15' in the pipe flange 15 after which the housing 14 can not turn any further in a counter-clockwise direction.

The fixed coupler 10 is intended to be a permanent marine installation on a ship or boat. Therefore it is hard chrome plated to be resistant to corrosion, and it has a smooth finish to be readily cleaned and polished and attractive in appearance. A plurality of these can be bulkhead, hull or deck mounted in different locations depending upon the plumbing options present in the ship or boat. In a constructed form of the invention the flange 15 was about 3" in diameter and the coupler 10 protruded only 2" from its mounting surface. The flange 15 is mounted in fixed position by screws 20, and since coupler 10 is smooth and protrudes only a short distance it is not unattractive and relatively safe or out of the way.

In assembling the housing or pipe 14 to the pipe flange 15, part 14 is inserted through the central opening 21 in the part 15 from the back and threaded into position until the rim 19 bottoms against the rim 15'. Viewed from the back, the threads 18 are right handed.

One advantage of such an arrangement is that when internal piping is threaded into the interior of the inner end of part 14 from behind its mounting continued turning of the piping will not loosen the part 14 from its mounting in part 15.

Turning now to removable couplers 11 and 12, these two components are the same except for their outer ends. The outer end of coupler 11 is internally threaded at part 30 so that it can receive the externally threaded male end part 31 of an end fitting 32 which threads on the hose 13. By contrast, in the coupler 12 the outermost end 40 is externally threaded so that it can receive the internally threaded female end 41 of an end fitting 42 on the hose 13. Thus, by using either one of the removable couplers 11 and 12, either the male or female end of a water hose can be readily quick connected to the stationary coupler 10.

Quick connection and disconnection of the couplers 11 and 12 to the stationary coupler 10 is accomplished by an indent groove 22 on the coupler 10 and a detent assembly on the inner ends of the couplers 11 and 12. The detent assembly comprises a cam sleeve 50 which is slidable left to right on the coupler housing 51. Cam sleeve 50 is biased to the left by an internal spring 52, and left hand movement is stopped by a split ring 53. A plurality of holes 54 are formed in housing or pipe part 51 beneath the cam sleeve 50. The housing or pipe part 51 serves as a detent carrier for a plurality of ball detent members 55 in the holes 54. Holes 54 are sized to allow balls 55 to protrude through the holes 54 into the indent groove 22 but not to pass clear through the holes 54.

In order to connect the couplers 11 and 12 with the coupler 10 the sleeve 50 is pulled back to the right to allow the balls 55 to rise slightly in their holes when they engage the front edge 22' of the indent 22. They will not fall out of their holes because they are still trapped therein by the slightly relieved or cutaway inner end of the sleeve 50. As with the coupler 10, the couplers 11 and 12 also have valves 56. Valves 56 are internal and are biased to closed position by a spring 57. After sleeve 50 is pulled back the couplers 11 and 12 are passed on to the coupler 10 and then forced there against to cause the valves 16 and 56 to engage and open. When the two valves 16 and 56 are unseated the balls 55 will be opposite the indent or groove 22 and will fall and be locked therein when the sleeve 50 is released. Ring seals 58 inside the detent carrier 51 effect a fluid seal between the two locked together couplers. Since both valves 16 and 56 are open fluid flow can be in either direction. In disconnecting the couplers 11 and 12 from coupler 10 there is no loss of fluid because the instant they are uncoupled the valves 16 and 56 are moved to closed position. To disconnect, the sleeve 50 is pulled back to allow the detent balls 55 to ride out of the indent groove 22 as the couplers 11 and 12 are withdrawn from the coupler 10.

Heretofore it has been stated that the system can be constructed from readily available components. For example, in one constructed form of the invention the couplers 10-12 were modified Parker brand marine hardware, the coupler 12 from a Parker 60 Series coupler, and the coupler 10 from a Parker 60 Series Nipple. It was heretofore stated that couplers 11 and 12 are the same except for their outer ends. Coupler 11 shows a Parker 60 Series coupler, but when converted into the coupler 12 its outer end 30 has been removed and then externally threaded at portion 40 in coupler 12 so that it will be adapted to receive the female end hose fitting 41 as contrasted to the male end part 31 with coupler 11. In the coupler 10 a Parker 60 Series Nipple has had the exterior of its inner end modified to include the threads 18 and the stop rim 19, and then this has been mounted in the pipe flange 15, and the parts hard chrome plated, all for the advantages mentioned heretofore.

Now that there has been shown and described one form of the invention it will be seen that the invention provides a readily fabricated or assembled marine coupling system which is low cost and versatile. One or a plurality of the couplers 10 can be located at fixed installations on any portion of the ship or boat, and by using a pair of the couplers 11 and 12 therewith either the male or female ends of hoses 13 can be connected thereto, and fluid flow can be in either direction and without any loss of fluid in making or breaking the connection.

I claim:

1. A marine coupler comprising a pipe flange having a first surface for mounting to a second surface substantially parallel thereto, said flange having a central opening and a separable tubular coupler housing extending out therefrom, the inner end of said tubular housing being mounted in said opening by a threaded connection therebetween, and a valve included within the outer end of the coupler housing.

2. A marine coupler comprising a pipe flange having a first surface for mounting to a second surface substantically parallel thereto, said flange having a central opening; a separable tubular coupler housing extending out therefrom, the inner end of said tubular housing being mounted in said opening by a threaded connection therebetween; a valve included within the outer end of the separable coupler housing; a stop integral with and on the innermost end of the tubular coupler housing behind the threaded connection, said stop comprising an abutment rim which is adapted to abut the edge of the opening in the pipe flange and stop the outward rotation of said housing; means inside the innermost end of said tubular housing for connecting piping thereto from behind said flange; and an indent groove on the exterior of said tubular housing which is adapted to have a detent operated removable coupler connected thereto.

3. In a coupler as in claim 2 to which said detent operated removable coupler has been telescoped thereon, said detent operated coupler comprising a tubular housing having a series of detent balls located proximate the end facing the pipe flange and adapted for seating the balls in the separable tubular coupler housing indent groove to connect the separable tubular coupler housing and the detent operated coupler together.

4. In a two coupler system as in claim 3, a valve inside the detent operated removable coupler which is adapted to engage and open the separable coupler housing valve and open itself when the detent operated coupler is connected to the separable tubular coupler housing, the end of said detent operated coupler away from the separable tubular coupler housing being adapted to mate with a fitting on the end of a hose.

5. A marine coupling system for use with a pipe flange having a first surface for mounting to a second surface substantially parallel thereto, said system comprising a fixed coupler and a pair of removable couplers which are each adapted to be telescoped to the fixed coupler and connected thereto, the fixed coupler being mounted in said pipe flange by a threaded connection backed up by a stop rim integral with the fixed coupler to limit further rotation of said fixed coupler with respect to said pipe flange and further extension of said fixed coupler in a direction external to said second surface and valves on each of said couplers which engage and open each other when said couplers are connected and which close when said couplers are disconnected, the outer ends of said removable couplers being adapted to have a hose connected thereto, the outer end of one of said removable couplers being adapted to receive a female hose fitting, and the outer end of the other of said removable couplers being adapted to receive a male end hose fitting.

6. A coupler for connecting two conduits comprising: an internally threaded pipe flange having a first surface for mounting to a second surface substantially parallel thereto, a tubular coupler housing open at one end and closed at the other, having a stop rim integral with said housing at the open end, a normally closed valve included within the closed end, internal threads at the open end for connecting to one conduit, external threads of the same pitch and diameter as the pipe flange threads proximate the stop rim, whereby the stop rim butts against the flange to prevent further rotation of the coupler housing when said housing is threaded through the flange and said one conduit is threaded into said open end internal thread, and means for connecting to the other conduit.

7. A marine coupling system for connecting to a source of fluid comprising; a fixed tubular coupler, open at one end and closed at the other, having a stop rim integral with the fixed coupler at the open end, a normally closed valve at the closed end, a detent groove intermediate both ends, internal threads at the open end, and external threads proximate the stop rim, an internally threaded pipe flange of the same thread, hand, pitch and diameter as the fixed coupler external thread, said pipe flange having a first surface for mounting to a second surface substantially parallel thereto, whereby the fixed coupler stop butts against the flange to prevent further rotation of the fixed coupler when said coupler is threaded through the flange and further extension of the fixed coupler out from said flange first surface, and two sleeve operated, ball detent, removable tubular couplers each having a normally closed valve interrupting passage therethrough for telescoping its ball detent end over the fixed coupler until the detent balls fall into the detent groove of the fixed coupler, whereby the fixed and removable coupler valves engage and open permitting fluid passage therethrough, one of said removable couplers having a male hose fitting on its other end, the other removable coupler having a female hose fitting on its other end.

* * * * *